United States Patent
So et al.

(10) Patent No.: US 6,671,085 B2
(45) Date of Patent: Dec. 30, 2003

(54) SWITCHABLE DYNAMIC GAIN-FLATTENED OPTICAL AMPLIFIERS AND METHODS WITH WIDE DYNAMIC GAIN RANGE

(75) Inventors: Vincent So, Ottawa (CA); Zhenguo Lu, Orleans (CA)

(73) Assignee: BTI Photonics Inc., Ottawa (CA)

( * ) Notice: Subject to any disclaimer, the term of this patent is extended or adjusted under 35 U.S.C. 154(b) by 0 days.

(21) Appl. No.: 10/042,334

(22) Filed: Jan. 11, 2002

(65) Prior Publication Data

US 2002/0149840 A1 Oct. 17, 2002

Related U.S. Application Data

(60) Provisional application No. 60/282,916, filed on Apr. 1, 2001.

(51) Int. Cl.[7] .............................................. H04B 10/12
(52) U.S. Cl. .............................. 359/341.42; 359/337.1; 359/349; 359/337.11; 359/341.41; 359/341.4
(58) Field of Search ............................. 359/337.1, 349, 359/337.11, 341.41, 341.42, 341.4

(56) References Cited

U.S. PATENT DOCUMENTS

| | | | | |
|---|---|---|---|---|
| 5,245,690 A | * | 9/1993 | Aida et al. ................... 385/142 |
| 5,392,154 A | * | 2/1995 | Chang et al. ............. 359/341.3 |
| 5,452,116 A | * | 9/1995 | Kirkby et al. ............... 359/124 |
| 5,812,710 A | * | 9/1998 | Sugaya ......................... 385/27 |
| 5,940,208 A | * | 8/1999 | Blaszyk et al. .......... 359/337.5 |
| 5,986,800 A | * | 11/1999 | Kosaka .................. 359/341.41 |
| 6,049,417 A | * | 4/2000 | Srivastava et al. ........ 359/337.4 |
| 6,069,731 A | * | 5/2000 | Bayart .................... 356/341.41 |
| 6,236,482 B1 | * | 5/2001 | Toyohara ..................... 359/134 |
| 6,400,498 B1 | * | 6/2002 | Shimomura et al. ...... 359/341.1 |
| 6,411,429 B1 | * | 6/2002 | Tomofuji et al. ............ 359/337 |
| 6,441,955 B1 | * | 8/2002 | Takatsu et al. .......... 359/341.4 |
| 6,483,636 B1 | * | 11/2002 | Sugaya et al. .............. 359/349 |

OTHER PUBLICATIONS

P.C. Becker et al. "Erbium–Doped Fiber Amplifiers: Fundamentals and Technology," Academic Press, 1999, pp. 273–277.*

Tomoharu Kitabayashi, Tetsuya Sakai, Akira Wada, "Novel Gain–Tilt Free L–band EDFA Using Thulium–doped Fiber", The Proceeding of the 27th European Conference on Optical Communication, Oct. 2001.

K.Wundke, D. Nolan, H. Rasmussen, W. Miller, P. Wigley, D. Weidman, "A Fiber–Based, Slope Adjustable Filter for EDFA Gain Tilt Control", The Proceeding of the 27th European Conference on Optical Communication, Oct. 2001.

Jung–Chin Chiao and Tizhi Huang, "Liquid–Crystal Optical Harmonic Equalizers", The Proceeding of the 27th European Conference on Optical Communication, Oct. 2001.

(List continued on next page.)

Primary Examiner—William A. Cushlinski, Jr.
Assistant Examiner—Stephen Cunningham

(57) ABSTRACT

A switchable dynamic gain-flattened optical amplifier with wide adjustable gain range is provided. Optical signals are amplified through common amplification such that the gain is approximately common to all optical signals. Further, gain specific amplification is then achieved through distinct amplification wherein the optical signal is routed through one of N parallel amplification paths each having its well-designed gain. The amplifier makes use of a control circuit to self-adjust quickly and respond to changes in input conditions, operating conditions of the optical amplifier and gain requirements while maintaining gain flatness and a low noise figure (NF) over a broad optical bandwidth and a wide range of gain levels. The optical amplifier is highly desirable in dense wavelength-division-multiplexed (DWDM) systems for responding to changes in operating conditions due to link loss, pump deterioration, channel add/drop, and network reconfigurations.

28 Claims, 3 Drawing Sheets

OTHER PUBLICATIONS

Seok Hyun Yun, Bong Wan Lee, Hyang Kyun Kim, and Byoung Yoon Kim, "Dynamic Erbium–Doped Fiber Amplifier Based on Active Gain Flattening with Fiber Acoustooptic Tunable Filters", IEEE Photonics Technology Letters, vol. 11, No. 10, Oct. 1999. pp 1229–1231.

B. J. Offrein, F. Horst, G. L. Bona, R. Germann, H. W. M. Salemink, and R. Beyeler, "Adaptive Gain Eaualizer in High–Index–Constrast SiON Technology", IEEE Photonics Technology Letters, vol. 12, No. 5, May 2000. pp 504–506.

Antonio Rodriguez–Moral, Paul Bonenfant, Stefano Baroni, and Ren Wu, "Optical Data Networking: Protocols, Technologies, and Architectures for Next Generation Optical Transport Networks and Optical Internetworks", Journal of Lightwave Technology, vol. 18, No. 12, Dec. 2000, pp 1855–1870.

Hyo Sang Kim, Seok Hyun Yun, Hyang Kyun Kim, Namkyoo Park, and Byoung Yoon Kim, "Actively Gain–Flattened Erbium–Doped Fiber Amplifier Over 35 nm by Using All–Fiber Acoustooptic Tunable Filters", IEEE Photonics Technology Letters, vol. 10, No. 6, Jun. 1998, pp 790–792.

Paul F. Wysocki, Justin B. Judkins, Rolando P. Espindola, Matthew Andrejco, and Ashish M. Vengsarkar, "Broad–band Erbium–Doped Fiber Amplifier Flattened Beyond 40 nm Using Long–Period Grating Filter", IEEE Photonics Technology Letters, vol. 9, No. 10, Oct. 1997, pp 1343–1345.

A. K. Srivastava, Y. Sun, J.L. Zyskind, and J.W. Sulhoff, "EDFA Transient Response to Channel Loss in WDM Transmission System", IEEE Photonics Technology Letters, vol. 9, No. 3, Mar. 1997, pp 386–388.

Gee–Kung Chang, Georgios Ellinas, John K. Gamelin, M.Z. Iqbal, and Charles A. Brackett, "Multiwavelength Reconfigurable WDM/ATM/SONET Network Testbed", Journal of Lightwave Technology, vol. 14, No. 6, Jun. 1996, pp 1320–1340.

* cited by examiner

SWITCHABLE DYNAMIC GAIN-FLATTENED OPTICAL AMPLIFIERS AND METHODS WITH WIDE DYNAMIC GAIN RANGE

RELATED APPLICATIONS

This application claims the benefit of U.S. Provisional Patent Application Ser. No. 60/282,916 filed Apr. 11, 2001.

FIELD OF THE INVENTION

The invention relates generally to optical amplifiers in optical communication systems. More specifically, the invention relates to optical amplifiers for large-capacity dense wavelength-division multiplexing (DWDM).

BACKGROUND OF THE INVENTION

Current and future high-speed, high capacity dense wavelength-division multiplexing (DWDM) communication systems have to handle two particular types of user services: multimedia services to multiple users, and selectcast data transport from user-to-user or from region-to-region. A dynamic reconfigurable multi-wavelength channel add/drop function at the user nodes can efficiently process the information of these two types of services, with minimum electronics at the access node, at lower system cost [see for example A. R. Moral et al. "Optical Data Networking: Protocols, technologies, and architectures for next generation optical transport networks and optical internetworks", J. LightWave Technol. vol. 18, 2000 pp. 1855–1870]. Fiber optical amplifiers will be used in these WDM networks to compensate for insertion loss of optical switches and transmission loss in optical fibers. When the network is reconfigured and wavelength channels are added or dropped, cross-gain saturation in fiber amplifiers will induce power transients in the surviving channels, which can cause service impairment not known in electronically switched networks. As fiber amplifiers saturate on a total power basis, addition or removal of channels in a multi-wavelength network will tend to perturb other channels that share all or part of the route. The power of the surviving channels should be maintained constant in order to prevent unacceptable error bursts if the surviving channel power becomes too low to preserve adequate eye opening or exceeds thresholds for optical nonlinearities.

For DWDM applications, all channels going through the same amplifier gain medium should have as low a noise figure (NF) and as high a gain as possible. In addition to gain and NF requirements, WDM amplifiers must also conform to tight specifications with respect to multichannel gain flatness, gain-tilt, and channel add/drop response. Gain variation is the main concern in designing amplifiers because the gain profile of an optical amplifier changes with its gain. Existing commercial gain-flattened DWDM amplifiers in the current market typically use passively gain-flattening filters. Passively gain-flattened DWDM amplifiers are usually designed for a specific gain requirement, i.e., a well-defined output level for a well-defined input level. They often operate under automatic gain control in the system, meaning that when the input is changed, the output is also changed proportionally, with the gain remaining fixed. This feature fits well in systems where the power level of all channels is fixed but not in cases where channels are added or dropped from an amplified system.

In many situations, the channel-power that is input into a DWDM amplifier, is not constant. If channels have to be switched, re-routed, or transported from one point to multiple points, then the channel power arriving at the entrance of a DWDM amplifier is not constant. If there is to be no degradation in system performance, then all channels must be at approximately the same power level at the DWDM amplifier output, independent of the input power. Thus, a DWDM amplifier must be able to provide a variable gain, without affecting the amplification uniformity across all channels. Alternatively, there may be situations where the input levels do not change, but instead the channels may be required to be routed along a different path with a larger loss. In such cases, the flexibility of increasing the amplifier gain may be required, again without compromising the gain uniformity. The problem is that for a passively gain-flattened DWDM amplifier, if gain changes over the certain small dynamic range, gain shape will change and the corresponding NF may increase. A passively gain-flattened amplifier is inadequate for the varying and demanding DWDM environment.

To solve the above problems, the DWDM amplifier must be actively gain controlled. Many dynamic gain-flattened DWDM amplifiers have been investigated recently [S. K. Yun, et al., Dynamic erbium-doped fiber amplifier based on active gain flattening with fiber acousto-optic tunable filter, IEEE Photon. Technol. Lett., vol.11, 1999, pp.1229–1231]. [B. J. Offrein, et al., Adaptive gain equalizer in high-index-contrast SiON technology, IEEE Photon. Technol. Lett., Vol.12, 2000, pp. 504–506]. [J. C. Chiao, et al., Liquid-crystal optical harmonic equalizers, The Proceeding of the 27th European Conference on Optical communication, October, 2001]. [K. Wundke, et al., A fiber-based, slope adjustable filter for EDFA gain tilt control, The Proceeding of the 27th European Conference on Optical communication, October, 2001]. [T. Kitabayashi, et al., Novel gain-tilt free L-band EDFA using Thulium-doped fiber, The Proceeding of the 27th European Conference on Optical communication, October, 2001]. All the above methods have limitations both in the dynamic gain range and the response time, which makes them unsuitable the future DWDM networking systems.

SUMMARY OF THE INVENTION

Dynamic gain-flattened fiber amplifiers with ultra-wide dynamic gain range and very fast response time across an operational wavelength range with a very flat wavelength response regardless of channel count or channel power level are provided. The maximum variable range of the gain level is preferably 30 dB or larger with very fast response time across the whole C- or L-band wavelength range.

One broad aspect of the invention provides a switchable dynamic gain-flattened optical amplifier with a wide dynamic gain range. An optical signal is first amplified through common amplification such that the gain is approximately common to all channels of the optical signal. Further amplification is then achieved through distinct amplification wherein the optical signal is routed through one of N parallel amplification paths each having its own fixed gain. Each distinct amplification of N parallel paths has a passive gain flattening filter (GFF) to flatten the output power profile across the whole operational wavelength range within a certain flatness requirement (for example, <±0.5 dB). Then the amplified signals are passed through a common variable optical attenuator (VOA) preferably having an attenuating range from 0 dB to L-dB.

Preferably, the value of the gain of the common amplification plus values of the fixed gain on the paths have been designed to satisfy the following relationship: $G_1=G_2-L=G_3-2L=\ldots=G_N-(N-1)L$, where $G_i$ is the common gain plus the fixed gain of the i-th path (i=1, 2, 3, ... N) and L is the maximum attenuating range of the common VOA. The total adjustable gain range of the dynamic gain-flattened optical amplifier in this case will be NL.

In order to self-adjust quickly and respond to changes in input conditions and/or operating conditions of the optical amplifier and output requirements while maintaining gain flatness and a low noise figure (NF) over a broad optical bandwidth and a wide range of gain levels, the switchable dynamic gain-flattened optical amplifier preferably makes use of two optical switches, one at the input to the N parallel amplification paths and one at the output of the N parallel amplification paths, to allow switching in and out one of the gain-flattening filters and gain mediums in parallel.

Preferably, a control function is provided to control the switchable gain amplifier. This involves controlling which of the paths an input signal should be routed through, and involves controlling the gain of the variable optical attenuator. A required overall gain may be input from a networking management system, and the control function makes adjustments to the switchable gain amplifier to best achieve the required overall gain. It may be necessary to control pump light source powers as well.

In a preferred embodiment, each time the control function detects an input level, it compares the input level with a preprogrammed look-up table and switches to a corresponding m-th amplification path. The control function may for example, make use of embedded software to control the common VOA to control the adjustable gain range from Gm to Gm-L within a very short time period preferably less than 1 ms.

In accordance with a first broad aspect of the invention, provided is a method of amplifying an optical signal. The method comprises first amplifying the optical signal. The optical signal is then further amplified through a selected one of a plurality of parallel amplification paths each having its respective fixed gain.

The method may further comprise performing gain equalization of channels of the optical signal in a respective one of the parallel amplification paths.

A variable gain is applied, for example with a common VOA, to dynamically control the gain within a certain range for the selected one of the parallel amplification paths. This may be done in response to changes in at least one of input conditions, output requirements, and operating conditions of an optical amplifier responsible for a respective one the first and further amplifications. Such dynamic control might further comprise switching the optical signal through a different one of the parallel amplification paths and/or changing the attenuating values of the VOA.

Another broad aspect of the invention provides a switchable optical amplifier. The optical amplifier comprises at least one common gain section and at least one switchable distinct gain section connected to receive an output of the common gain section. The switchable distinct gain section has a plurality of parallel amplification paths each having distinct gain characteristics.

In some embodiments, the common gain section might comprise an erbium-doped fiber amplifier (EDFA). In such embodiments at least one of the common gain section and the switchable distinct gain section may comprise a pump light source.

The parallel amplification paths may comprise a plurality of sections of the erbium-doped fiber (EDF) and in such a case the optical amplifier may comprise a pump light source, which is common to the plurality of sections of EDF. In such a case, each section of the erbium-doped fiber may have a different length.

A common VOA (variable optical attenuator) is preferably provided at the output of the switchable gain section for allowing a range of variability in the overall gain when a particular path in the distinct gain section is selected.

Each one of the pluralities of parallel amplification paths may comprise a respective gain flattening filter. In addition, each one of the plurality of parallel amplification paths in combination with both the common VOA and the common gain section may be adapted to provide a respective dynamic gain range with a desired gain flatness and a low noise figure over a broad optical bandwidth for a certain input/output power range.

The switchable distinct gain section may have N parallel amplification paths. In such a case the switchable distinct gain section may further comprise a 1×N input optical switch. Such an optical switch is adapted to connect the common gain section to any particular one of the N parallel amplification paths. In addition, in such a case, the optical amplifier also comprises an N×1 output optical switch that is adapted to connect the N parallel amplification paths to the common VOA, which connects to a common output.

The optical amplifier may be adapted for use as a C-band DWDM amplifier. In another embodiment, the optical amplifier further comprises an additional section of erbium-doped fiber between the common gain section and the parallel amplification paths. The additional section of the erbium-doped fiber is adapted to receive pump light from the pump light source, which causes inversion in the additional section of the erbium-doped fiber. The inversion results in further amplification of the optical signal and the generation of ASE a forward component of which might acts as a pump source together with the original pump source in the parallel amplification paths. Such an optical amplifier might be adapted for use as an L-band DWDM amplifier.

Preferably, the optical amplifier further comprises a control function that might be any suitable combination of hardware and/or software. Broadly speaking, the control function is responsible for selecting one of the parallel amplification paths. In some embodiments, it may be further adapted to adjust gain characteristics of the common optical amplifier section(s) and the switchable distinct gain section to achieve constant locked gain, which depends on the distinct passive GFF.

In another embodiment the control function is adapted to adjust the gain characteristics through a control pattern with a control speed that avoids optical transience during channel add/drop. The control function might also be further adapted to adjust the common VOA or to tune gain characteristics of at least one of the common gain section and the switchable distinct gain section to achieve gain-tilt-free operation and/or low noise figure. In some embodiments, the control function may be further adapted to dynamically adjust pump light source power to achieve at least one of said constant locked gain, gain-tilt-free operation and the low noise figure. In yet other embodiments, the control function may be further adapted to dynamically control a common VOA to achieve the desired gain from networking management systems. In such embodiments, this might be done in response to at least one of the input and/or output variations, new output requirements and changing operating conditions within the optical amplifier.

In order to facilitate this control, preferably the optical amplifier has an input asymmetric tap coupler that is adapted to route a portion of an input optical signal as a subsidiary input optical signal to the control function for monitoring input conditions. The optical amplifier might also comprise an input photodiode detector adapted to convert the subsidiary input optical signal into an electrical signal. Preferably the optical amplifier also has an output asymmetric tap coupler adapted to route a portion of an output optical signal as a subsidiary output conditions. The optical amplifier might convert the output optical signal into an electrical signal for use by the control function.

The parameters may be adjusted to provide at least one of a control loop for a constant locked gain, gain-tilt free operation and a low noise figure. The instructions may comprise switching an optical signal through one of a plurality of parallel amplification paths. The instructions might also comprise adjusting the VOA and/or the pump laser sources.

Advantageously, the invented optical amplifier is highly effective, in dense wavelength-division-multiplexed (DWDM) systems, in compensating for changes in operating conditions due to link loss change, pump deterioration, channel add/drop, and network reconfigurations.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
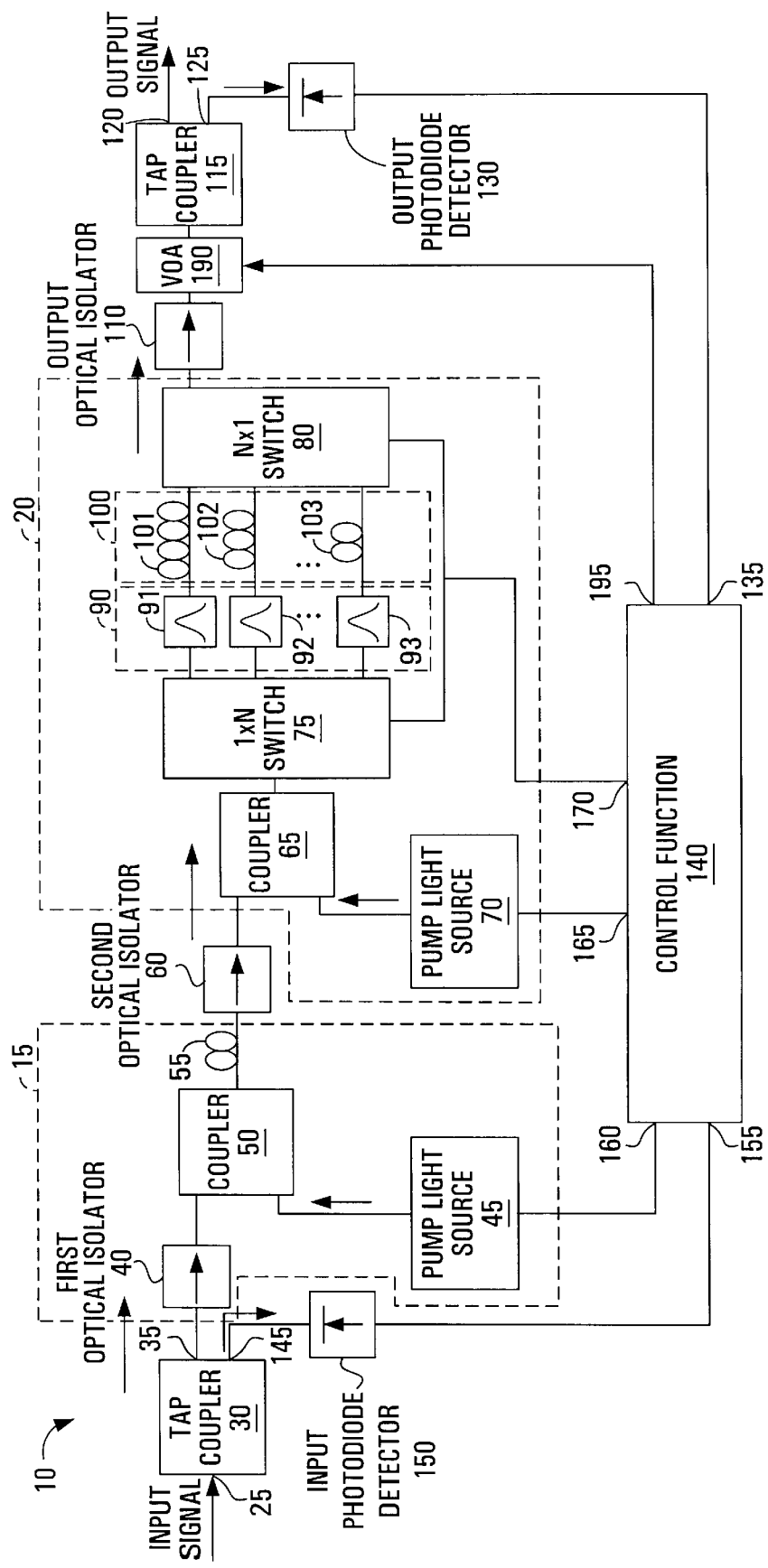
FIG. 1 is a block diagram of a switchable dynamic gain-flattened optical amplifier, which is suitable for the C-band wavelength range, provided by an embodiment of the invention.

Referring to FIG. 1, shown is a block diagram of a switchable dynamic gain-flattened optical amplifier generally indicated by 10, provided by an embodiment of the invention. The amplifier may, for example, be designed so as to be suitable for the C-band wavelength range but other wavelength ranges may alternatively be accommodated. An input 25 of the optical amplifier 10 coincides with an input of an input asymmetric tap coupler 30. A main output 35 of the input asymmetric tap coupler 30 is connected to a common gain section 15. Common gain section 15 may be any suitable gain block. In the preferred embodiment of FIG. 1, the common gain section 15 includes a first optical isolator 40 connected to the main output 35 of the input asymmetric tap coupler 30; a first coupler 50 connected to the first optical isolator 40; a first pump light source 45 connected to the first coupler 50 and a common optical amplification medium (OAM) 55 connected to the first coupler 50. In the preferred embodiment of FIG. 1, the first coupler 50 is a dense wavelength-division multiplexer (DWDM), the first pump light source 45 is a pump laser source and the common OAM 55 is an erbium-doped fiber (EDF). In other embodiments the first pump light source 45 is any suitable pump light source such as a pump laser diode or more specifically, a 980 nm or 1480 nm pump laser diode.

In other embodiments, the common OAM 55 is a waveguide or any suitable optical amplification medium.

The common OAM 55 is connected to a second optical isolator 60 which is in turn connected to a switchable distinct gain section 20. The switchable distinct gain section 20 includes a second coupler 65 connected to the second optical isolator 60. A second pump light source 70 is also connected to the second coupler 65. In the preferred embodiment of FIG. 1, the second coupler 65 is a DWDM and the second pump light source 70 is a pump laser source. In other embodiments the second pump light source 70 is any suitable pump light source such as a pump laser diode or more specifically, a 980 nm or 1480 nm pump laser diode. The switchable distinct gain section 20 also includes a first optical switch 75 connected to the second coupler 65 and a second optical switch 80. The first optical switch 75 has N outputs connected, through N paths, to respective ones of N inputs of the second optical switch 80. In the preferred embodiment of FIG. 1, the first optical switch 75 and the second optical switch 80 are high speed 1×N and N×1 optical switches, respectively. Each one of the N paths includes one of N gain equalization filters 90. Only three gain equalization filters 91, 92, 93 are shown. Similarly, each one of the N paths includes a respective one of N distinct OAMs 100. Only three OAMs 101, 102, 103 are shown. In the preferred embodiment of FIG. 1, the distinct OAMs 100 are EDFs. In other embodiments, the distinct OAMs 100 are wave-guides or any suitable optical amplification media. In the preferred embodiment of FIG. 1, the distinct OAMs 100 preferably each have a specific length with the lengths each providing a respective designed gain.

The second optical switch 80 is connected to an output optical isolator 110. The output optical isolator 110 is connected to a common variable optical attenuator 190. The common optical variable attenuator 190 is connected to an output asymmetric tap coupler 115. The output asymmetric tap coupler 115 has a main output 120 that coincides with an overall output of the optical amplifier 10 and it has a subsidiary output 125.

The subsidiary output 125 of the output asymmetric tap coupler 115 is connected to an output photodiode detector 130 and the output photodiode detector 130 is connected to an input 135 of a control function 140. Similarly, a subsidiary output 145 of the input asymmetric tap coupler 30 is connected to an input photodiode detector 150 which is in turn connected to an input 155 of the control function 140. The control function 140 is also connected to the first pump light source 45 through a port 160 and is also connected to the second pump light source 70 through a port 165. An output 170 of the control function 140 is connected to the first optical switch 75 and the second optical switch 80. Another output 195 of the control function 140 is connected to the common variable optical attenuator 190.

Each one of the N paths of the switchable distinct gain section 20 cascaded with both the common gain section 15 and common variable optical attenuator 190 provides a respective dynamic gain range with desired gain flatness and low noise figure over a broad optical bandwidth. A specific gain is obtained by connecting one of the N paths through to the common gain section 15 with the use of the first and second optical switches 75, 80, respectively, and controlling inversion level in the common OAM 55 and in a respective one of the distinct OAMs 100.

Preferably, the value of the gain of the common gain section plus the values of the fixed gain on the paths are designed to satisfy the following relationship: $G_1 = G_2 - L =$ $G_3-2L=\ldots=G_N-(N-1)L$, where $G_i$ is the common gain plus the fixed gain of the i-th path (i=1, 2, 3, ... N) and L is the maximum attenuating range of the common VOA. The total adjustable gain range of the dynamic gain-flattened optical amplifier with such a design will be NL.

In operation, an input optical signal, typically having a plurality of channels, is input at the input asymmetric tap coupler 30 where it is split such that a significant portion of the input optical signal is output at the main output 35 resulting in a main input optical signal. In addition, a small portion of the input optical signal is output at the subsidiary output 145 of the input asymmetric tap coupler 30 resulting in a subsidiary input optical signal. The main input optical signal propagates to the common gain section 15 and into the first optical isolator 40. It then propagates to the first coupler 50 where it is coupled to the pump light generated by the first pump light source 45.

In a preferred embodiment of the invention, the first coupler 50 is a DWDM and it couples light in a particular wavelength range, for example, 1526 to 1610 nm from the first optical isolator 40 together with the first pump light from the first pump light source 45 into the common OAM 55, and couples light in the same range from the common OAM 55 back into the first optical isolator 40. While a DWDM is employed in this embodiment to achieve the desired effect, any suitable coupling arrangement may alternatively be employed.

The main input optical signal and the first pump light propagate from the first coupler 50 to the common OAM 55. The first pump light causes inversion in the common OAM 55. The common OAM 55 is preferably strongly inverted to achieve a high a low NF. Preferably, the length of the common OAM 55 is much shorter than that of the distinct OAMs 100. To achieve a low noise figure (NF), the inversion in the common section 15 should be made as high as possible. This means either a high power pump light source 45 is employed, and/or OAM 55 is made short. The length of the OAM 55 might for example be 25% to 33% of the total length of the OAM 55 plus one of the OAMs 100. A preferred inversion level for C-band amplification is larger than 90%.

A first amplification of the main input optical signal results from the inversion in the common OAM 55 such that the channels of the optical signal undergo an approximately common gain wherein the gain variance from one channel to another depends only on the gain curve characteristics of the common OAM 55. A first amplified optical signal results from the first amplification of the main input optical signal. An amplified spontaneous emission (ASE) is generated in the common OAM 55, a backward component of which propagates back through the first coupler 50 and into the first optical isolator 40 where it is suppressed. The optical isolator 40 also suppresses the back-reflected amplified signals from the common gain section 15.

The first amplified optical signal exits the common gain section 15 and propagates through the second optical isolator 60 before propagating to the switchable distinct gain section 20. The second optical isolator 60 suppresses a backward component of ASE and the back-reflected amplified signals generated in the switchable distinct gain section 20. In the switchable distinct gain section 20, the first amplified optical signal propagates through the second coupler 65 where a second pump light generated form the second pump light source 70 is coupled to the first amplified optical signal. In a preferred embodiment of the invention, the second coupler 65 is a DWDM and it couples light in a particular wavelength range, for example, 1526 to 1610 nm from the second optical isolator 60 together with the second pump light into the first optical switch 75, and couples light in the same range from the first optical switch 75 back into the second optical isolator 60. While a DWDM is employed in this embodiment to achieve the desired effect, any suitable coupling arrangement may alternatively be employed. The first amplified optical signal and the second pump light propagate to the first optical switch 75 where the first amplified optical signal and the second pump light are both routed to a selected one of the N outputs of the first optical switch 75. The first amplified optical signal and the second pump light then both propagate through one of the gain equalization filters 90 to one of the distinct OAMs 100.

Preferably, each one of the equalization filters 90 is a passive gain-flattened filter and will only fit certain gain values for the fiber amplifier. For different gain values, different gain-flattened filters are employed to flatten their gain profiles. The one of the gain equalization filters 90 through which the first amplified optical signal propagates performs gain equalization of the channels of the first amplified optical signal whereas the second pump light, which has a short wavelength, propagates through the respective one of the gain equalization filters 90 unaffected. The second pump light propagating through the respective one of the distinct OAMs 100 causes inversion in the selected one of the distinct OAMs 100, preferably at a level which is suitable for C-band amplification. Since each one of the distinct OAMs 100 has a specific length, propagation of the first amplified optical signal through the respective one of the distinct OAMs 100 provides a distinct amplification of the first amplified optical signal with a gain that is specific to the path through which the first amplified optical signal is routed. The distinct amplification results in an output optical signal that is switched to a common output at the second optical switch 80. The output optical signal then propagates to the output optical isolator 110. The output optical isolator 110 suppresses any back-reflected optical signal from the VOA 90, tap coupler 115 and the main output 120. The output optical signal from the isolator 110 propagates into the VOA 190 which is controlled by control function 140. The output optical signal then propagates to the output asymmetric tap coupler 115 where a significant fraction of the output optical signal propagates to the main output 120 of the output asymmetric tap coupler 115 resulting in a main output optical signal. In addition, a small fraction of the output optical signal propagates to the subsidiary output 125 of the output asymmetric tap coupler 115 resulting in a subsidiary output optical signal.

The subsidiary output optical signal at the subsidiary output 125 of the output asymmetric tap coupler 115 propagates to the output photodiode detector 130 where it is converted into an electrical signal that propagates to the input 135 of the control function 140 providing information on the power level of the output optical signal. Similarly, the subsidiary input optical signal at the subsidiary output 145 of the input asymmetric tap coupler 30 propagates to the input photodiode detector 150 where it is converted into an electrical signal that propagates to the input 155 of the control function 140 providing information on the power level of the input optical signal. Information provided by the electrical signals at inputs 135, 155 is used by the control function 140 to control output characteristics of the main output optical signal. A preferred method by which the control function 140 responds to the information at inputs 135, 155 is described herein below with respect to FIG. 3.

The control function 140 also preferably monitors current and temperature characteristics of the first pump light source 45 and the second pump light source 70 by way of electrical signals received at ports 160, 165, respectively.

The control function 140 controls parameters responsible for controlling the output of the optical amplifier 10 as described herein below. The control function 140 may be any suitable hardware and/or software and/or controller and is preferably implemented as software running on a microprocessor. Alternatively, the software may be impressed as hardware into the microprocessor.

The control function 140 controls the first and second pump light sources, 45, 70, the first and second optical switches, 75, 80, and the VOA 190. It does so to compensate for changing output requirements and to compensate for changing operating conditions within the optical amplifier 10 and/or within the network in which it the optical amplifier 10 is connected. The output requirements include achieving a required gain while maintaining a low noise figure, gain-tilt free operation, and a certain flatness requirement.

For a certain output requirement, the control function 140 monitors power variations of the input optical signal, which might occur for example due to link loss change, channel add/drop and network re-configurations, to compensate for these variations and provide constant output. In response to variations in the power of the input optical signal the control function 140 provides instructions to the first and second pump light sources, 45, 70, the first and second optical switches, 75, 80, and the VOA 190. More specifically, the control function 140 provides instructions to the first and second pump light sources 45, 70, for controlling respective pump powers. The control function 140 also provides instructions to the first and second optical switches 75, 80, for routing the first amplified optical signal and the second pump light through one of the N paths. The control function 140 also provides instructions to the VOA 190 for adjusting the attenuating value.

Changes within the optical amplifier 10 such as deterioration of the first and second pump light sources 45, 70, respectively, can cause fluctuations in the gain characteristics of the optical amplifier 10 and consequently the control function 140 monitors current and temperature of the first and second pump light sources 45, 70, respectively. The output powers of the pump light sources 45, 70 are dependent on both injection current and the operating temperature. Measuring the current and temperature allows the control function 140 to respond and compensate for changing operating conditions of the first and second pump light sources 45, 70, respectively, by providing instruction to a respective one of the first and second pump light sources 45, 70, respectively, on the required pump power.

In one embodiment, the instructions provided by the control function 140 to the first and second pump light sources, 45, 70, respectively, the first and second optical switches, 75, 80, respectively, and the VOA 190 are provided by way of a control pattern to achieve a certain output requirement. The control pattern requires that the power of the output optical signal be monitored and is described herein below with respect to FIG. 3. When the output requirements change, the control function 140 provides instructions to the first and second pump light sources, 45, 70, respectively, and the first and second optical switches, 75, 80, and the VOA 190 through a different control pattern in order to self-adjust. These control patterns allow the control function 140 to control the output of the optical amplifier 10 with a fast control speed that prevents the deterioration of the optical networking system performance. The control speed is dependent upon the particulars of the overall system design, for example being dependent upon particular optical hardware design, electrical hardware design and firmware designs.

Each one of N distinct amplifications of the switchable distinct gain section 20 cascaded with both the common gain section 15 and the VOA 190 provides one of N combinations each with its own dynamic range of gain with the required flatness across the whole operation wavelength range. The control function 140 is also calibrated to provide instructions on the required pump power of the first and second pump light sources for achieving low noise figure and gain flatness for each one of the N combinations. In effect, each one of the N distinct amplifications of the switchable distinct gain section 20 cascaded with both the common gain section 15 and the VOA 190 provide one of the N combinations each with its own dynamic range of gain and also with acceptable gain flatness and low NF over a broad optical bandwidth for the L-dB input/output power changing range where L is the maximum attenuating value of the VOA 190. The optical amplifier 10 includes all N combinations to achieve the large adjustable gain range of NL while maintaining a low noise figure and gain flatness wherein a particular gain range is obtained by selecting an appropriate one of the N combinations.

Figure 2:
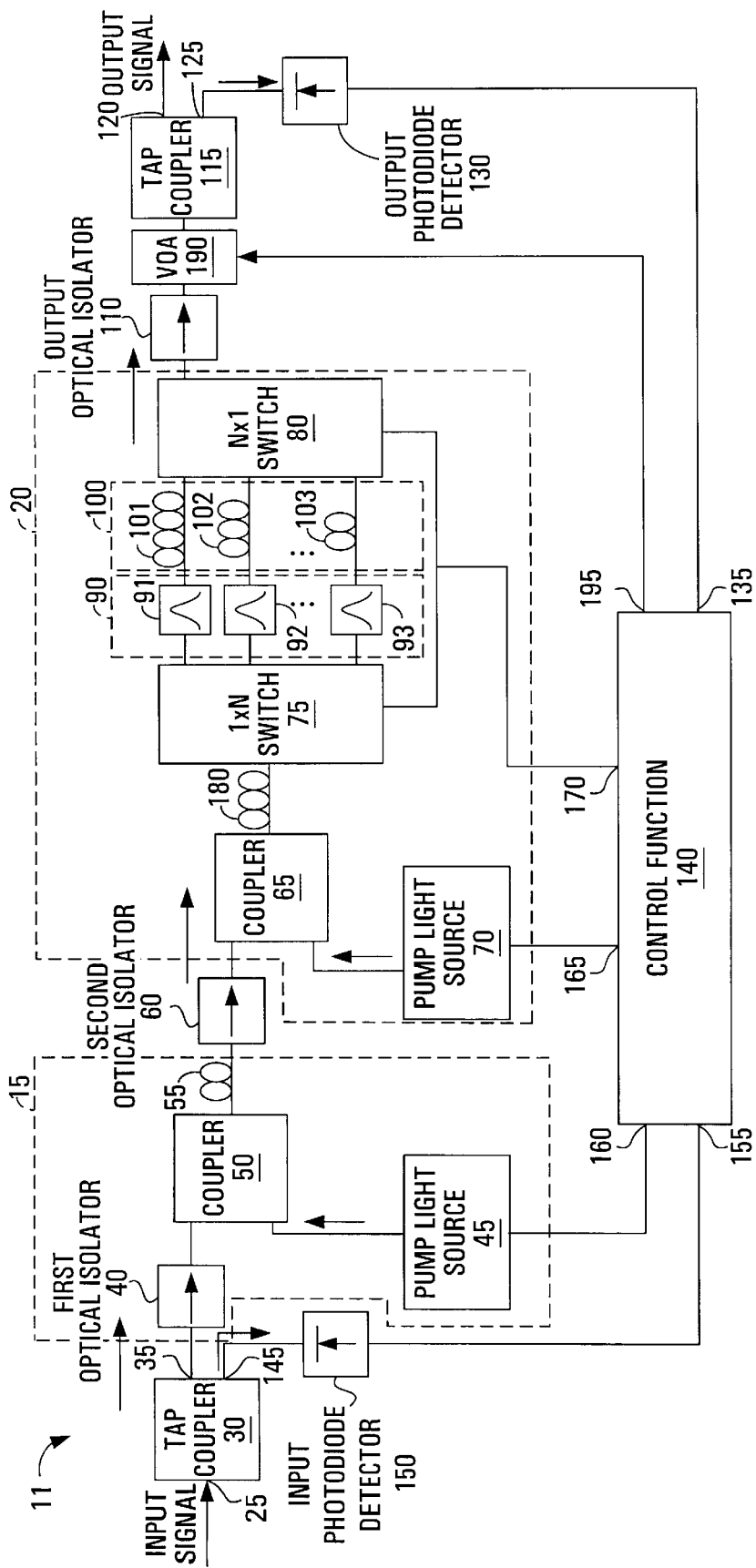
FIG. 2 is a block diagram of a switchable dynamic gain-flattened optical amplifier, which is suitable for the L-band wavelength range, provided by another embodiment of the invention.

Referring to FIG. 2, shown is a block diagram of a switchable dynamic gain-flattened optical amplifier generally indicated by 11, which is suitable, for example, for the L-band wavelength range, provided by another embodiment of the invention. The optical amplifier of FIG. 2 is similar to the optical amplifier 10 of FIG. 1 except that a second OAM 180 is connected between the second coupler 65 and the first optical switch 75.

An input optical signal is input at the input asymmetric tap coupler 30 resulting in a main input optical signal carrying a significant fraction of the input optical signal and propagating to the common gain section 15. The main input optical signal undergoes a first amplification through the common gain section 15 resulting in a common amplified optical signal that propagates through the second optical isolator 60 to the switchable distinct gain section 20. In the switchable distinct gain section 20, the second pump light, from the second pump light source 70, causes inversion in the second OAM 180. The inversion in the second OAM 180 results in further amplification of the common amplified optical signal and generation of ASE a forward component of which propagates into the first optical switch 75, through a respective one of the gain equalization filters 90, and into a respective one of the distinct OAMs 100 thereby causing inversion in the distinct OAMs 100. The first amplified optical signal propagates to the first optical switch 75 where it is routed and amplified through one of the N paths. The inversion caused by the forward component of ASE in the respective one of the distinct OAMs 100 results in amplification of the channels of the first amplified optical signal in the L-band resulting in an output optical signal. The output optical signal is then switched by the second optical switch 80 through to the output optical isolator 110 and into the VOA 190. The output signals from the VOA 190 go through the output asymmetric tap coupler 115 where a significant fraction of the output optical signal is directed as a main output optical signal at the main output 120 of the output asymmetric tap coupler.

The above described embodiments with respect to FIGS. 1 and 2 have assumed a single common gain section 15, a single switchable distinct gain section 20 and the VOA 190.

It is to be understood that multiple common gain sections may be employed in combination with multiple switchable distinct gain sections.

Figure 3:
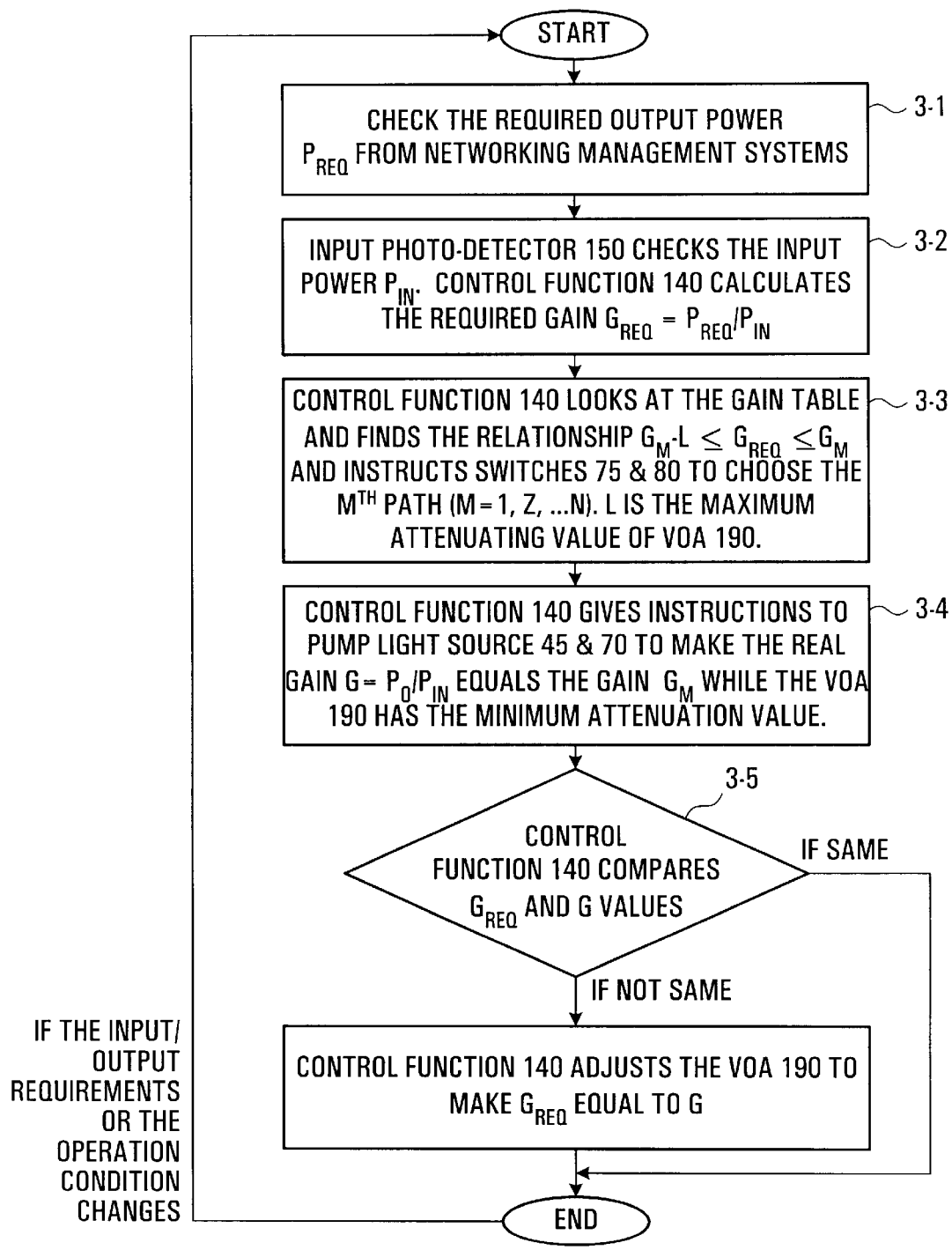
FIG. 3 is a flow chart describing steps used by a control function of FIGS. 1 and 2 in providing instructions for dynamically controlling gain in a respective one of the optical amplifiers of FIGS. 1 and 2.

Referring to FIG. 3 shown is a flow chart describing steps used by control function 140 of FIGS. 1 and 2 in providing instructions for dynamically controlling gain in a respective one of the optical amplifiers 10, 11 of FIGS. 1 and 2.

In step 3-1, the first step is obtain the required output power $P_{req}$, for example by checking the required output power from networking management systems.

In step 3-2, input photodetector 150 checks the input power $P_{in}$. Control function 140 then calculates the required gain $G_{req}=P_{req}/P_{in}$. Steps 3-1 and 3-2 can be omitted if a required gain is known.

In step 3-3, the control function 140 determines which path through the switchable gain section 20 to choose. Assuming the common gain plus the ith gain specific path has a gain of Gi (i=1, . . . N), the control functions finds the particular mth path which satisfies $G_m-L<=G_{req}<=G_m$, L being the maximum attenuation value of the VOA 190. Then, instructions are given to the switches 75, 80 to choose the mth path.

At step 3-4, the control function 140 gives the instructions to the pump light sources 45 and 70 to make the real gain $G=P_{out}/P_{in}$ equal to the well designed gain $G_m$ while the VOA 190 has the minimum attenuation value.

At step 3-5, the control function 140 compares the required gain $G_{req}$ and actual real gain G. If these are the same, then the process ends. Otherwise, if they are not the same, control function 140 adjusts the VOA 190 to make $G_{req}$ equal to G.

The whole process begins again if the input/output requirements change or the operating conditions change.

In another embodiment, rather than providing gain equalization filters which completely flatten gain response, the filters may be instead tuned to compensate for gain-tilt effect further down the transmission line.

In another embodiment, The control function 140 may operate on a table look-up basis, taking the input level and selecting the appropriate path from a pre-programmed look-up table and adjusting other parameters as well.

Numerous modifications and variations of the present invention are possible in light of the above teachings. It is therefore to be understood that within the scope of the appended claims, the invention may be practised otherwise than as specifically described herein.

We claim:

1. A method of amplifying an optical signal, the method comprising:
    amplifying the optical signal in a common gain stage to produce a first intermediate signal; and
    further amplifying the first intermediate signal through one of a plurality of N parallel amplification paths each having its respective gain to produce a second intermediate signal;
    applying a controllable variable attenuation to the second intermediate signal to produce an output signal,
    wherein the gain of the common stage and the respective gains of the N parallel amplification paths are selected to substantially satisfy $G_1=G_2-L=G_3-2L= \ldots =G_N-(N-1)L$, where each of $G_1, G_2, G_3, \ldots$, and $G_N$ is the gain of the first stage plus the gain of the 1st, 2nd, 3rd, . . . , and N-th path respectively and L is a maximum attenuating range of the controllable variable attenuation.

2. A method according to claim 1 further comprising performing gain equalization of channels of the optical signal in a respective one of the parallel amplification paths before further amplifying the optical signal.

3. A method according to claim 1 further comprising dynamically controlling the gain in at least one of the first and further amplifications in response to changes in at least one of input conditions, output requirements, and operating conditions of an optical amplifier responsible for a respective one the first and further amplifications.

4. A method according to claim 3 wherein the dynamically controlling the gain comprises switching the optical signal through one of the parallel amplification paths.

5. A method according to claim 3 wherein the dynamically controlling the gain comprises adjusting the gain in at least one of the first and further amplifications.

6. A method according to claim 3 therein dynamically controlling the gain comprises adjusting the gain in at least one of the first amplification and the parallel amplification paths to achieve at least one of gain-tilt free operation, low noise figure, and gain-tilt free operation and low noise figure.

7. A switchable optical amplifier comprising:
    at least one common gain section; and
    at least one switchable distinct gain section connected to receive an output of the common gain section, the switchable distinct gain section having a plurality of N parallel amplification paths each having distinct gain characteristics;
    a common variable optical attenuator adapted to apply a variable attenuation so as to provide a range of gain for the common gain section plus each parallel amplification path,
    wherein the gain of the common gain stage and the respect distinct gain characteristics of the N parallel amplification paths are selected to substantially satisfy $G_1=G_2-L=G_3-2L= \ldots =G_N-(N-1)L$, where each of $G_1, G_2, G_3, \ldots$, and $G_N$ is the gain of the common gain stage plus the gain of the 1st, 2nd, 3rd, . . . , and N-th path respectively and L is a maximum attenuating range of the controllable variable attenuator.

8. An amplifier according to claim 7 wherein the common gain section comprises an erbium-doped fiber amplifier (EDFA).

9. An amplifier according to claim 8 wherein at least one of the common gain section and the switchable distinct gain section comprises a pump light source.

10. An amplifier according to claim 7 wherein the plurality of the parallel amplification paths comprises a plurality of sections of erbium-doped fiber (EDF) and a pump light source which is to common to the plurality of sections of EDF.

11. An amplifier according to claim 10 wherein each section of erbium-doped fiber has a different length.

12. An amplifier according to claim 10 further comprising an additional section of erbium-doped fiber between the common gain section and the parallel amplification paths adapted to receive pump light from the pump light source causing inversion in the additional section of erbium-doped fiber, the inversion resulting in further amplification of the optical signal and generation of ASE a forward component of which acts as a pump source in the parallel amplification paths.

13. An amplifier according to claim 12 adapted for use as an L-band DWDM amplifier.

14. An amplifier according to claim 7 wherein each of the plurality of parallel amplification paths further comprises a respective gain equalization filter.

15. An amplifier according to claim 7 wherein each of the plurality of parallel amplification paths in combination with the common gain section is adapted to provide a respective dynamic gain range with an acceptable gain flatness and a low noise figure over a broad optical bandwidth for a certain small input power range.

16. An amplifier according to claim 7 wherein the switchable distinct gain section has N parallel amplification paths, and the switchable distinct gain section further comprises a 1×N input optical switch adapted to connect the common gain section to any particular one of the N parallel amplification paths.

17. An amplifier according to claim 16 further comprising an N×1 output optical switch adapted to connect the N parallel amplification paths to a common output.

18. An amplifier according to claim 7 adapted for use as a C-band DWDM amplifier.

19. An amplifier according to claim 7 further comprising a control function implemented in one of hardware, software, and a combination of hardware and software, adapted to adjust gain characteristics of at least one of the common optical amplifier section and the switchable distinct gain section to achieve constant locked gain.

20. An amplifier according to claim 19 wherein the control function is further adapted to adjust the gain characteristics through a control pattern with a control speed that avoids optical transience during channel add/drop.

21. An amplifier according to claim 19 wherein the control function is further adapted to tune gain characteristics of at least one of the common gain section and the switchable distinct gain section to achieve at least one of gain-tilt-free operation, low noise figure, and gain-tilt-free operation and low noise figure.

22. An amplifier according to claim 19 wherein the control function is further adapted to dynamically adjust pump light source power to achieve at least one of said constant locked gain, gain-tilt-free operation and low noise figure.

23. An amplifier according to claim 19 wherein the control function is further adapted to dynamically control which one of the plurality of parallel amplification paths is connected to the common amplifier stage.

24. An amplifier according to claim 23 wherein the control function is further adapted to control which of the parallel amplification paths is connected to the common amplifier stage in response to at least one of input variations, output variations, gain-tilt, new output requirements and changing operating conditions within the optical amplifier.

25. An amplifier according to claim 24 comprising an input asymmetric tap coupler adapted to route a portion of an input optical signal as a subsidiary input optical signal to the control function for monitoring input conditions.

26. An amplifier according to claim 25 comprising an input photodiode detector adapted to convert the subsidiary input optical signal into an electrical signal.

27. An amplifier according to claim 24 comprising an output asymmetric tap coupler adapted to route a portion of an output optical signal as a subsidiary output optical signal to the control function for monitoring output conditions.

28. An amplifier according to claim 27 comprising an output photodiode detector adapted to convert the subsidiary output optical signal into an electrical signal.

* * * * *